United States Patent [19]

Bäurle et al.

[11] Patent Number: 5,138,132
[45] Date of Patent: Aug. 11, 1992

[54] METHOD FOR NOISE REDUCTION

[75] Inventors: Klaus Bäurle, Wangen; Florian Maciaszczyk, Ebersbach; Wolfgang Schuster, Esslingen, all of Fed. Rep. of Germany

[73] Assignee: Rehm Schweisstechnik GmbH u. Co., Fed. Rep. of Germany

[21] Appl. No.: 660,626

[22] Filed: Feb. 25, 1991

[30] Foreign Application Priority Data

Feb. 28, 1990 [DE] Fed. Rep. of Germany ....... 4006202

[51] Int. Cl.⁵ .............................................. B23K 9/10
[52] U.S. Cl. .......................... 219/137 PS; 219/130.51
[58] Field of Search .......... 219/130.51, 130.5, 137 PS, 219/130.31, 130.32, 130.33, 130.1, 130.4

[56] References Cited

U.S. PATENT DOCUMENTS 4,876,433  10/1989  Kashima et al. ............... 219/130.51

FOREIGN PATENT DOCUMENTS 3150510   8/1982   Fed. Rep. of Germany .
3803447   5/1989   Fed. Rep. of Germany .
1556270  11/1967   France .
1-150469  6/1989   Japan ................................. 219/130.4
958053    9/1982   U.S.S.R. ........................ 219/130.51
2090705   7/1982   United Kingdom .

Primary Examiner—Clifford C. Shaw
Attorney, Agent, or Firm—Speckman & Pauley

[57] ABSTRACT

This invention relates to a method for noise reduction and stabilization of the welding arc in TIG-ac-welding machines with self-commutated inverter current sources where the alternating frequency of the welding current is preferably changed in the inverse direction as a function of the amount of the welding current.

1 Claim, 1 Drawing Sheet

METHOD FOR NOISE REDUCTION

BACKGROUND OF THE INVENTION

1. Field of the Invention

This invention relates to a method for noise reduction and stabilization of the welding arc in TIG-ac-welding machines with self-commutated inverter current sources.

2. Description of Prior Art

TIG-ac-welding machines with self-commutated inverter current sources, such as are disclosed by German Patent DE 31 50 510 A1, make it possible to pre-select the alternating frequency of the welding current. This technology has only become economically feasible due to rapid power semiconductors, which have only recently become available. The following points should be considered in the choice of the correct alternating frequency:

A dc welding arc has negligible sound emissions with acceptable current quality. However, commutation processes continuously occur during ac welding. During this commutation process, the current becomes zero and returns to its original value, but with reversed polarity. Also occurring is a pole reversal of the magnetic field to which the arc is subjected as ionized plasma. The plasma moves in this magnetic field like an almost inertialess diaphragm in a loudspeaker and thus emits noises. High-speed flow changes occur with high welding currents causing strong changes in the magnetic flux and resulting in the sound emission level of the ionized welding arc becoming very high. Furthermore, the absolute level of the emitted noise is directly proportional to the alternating frequency because such noise-generating commutation processes occur correspondingly more often.

Research using test persons has shown that, with a given welding current, the subjective noise level actually does increase substantially with the alternating frequency and is felt to be penetratingly disturbing at frequencies around 200 Hz.

From the perspective of environmental damage, it is not recommended to operate a TIG-ac-welding machine at a high frequency, for example 150 Hz, simultaneously with a high welding current, for example 250 A or more. However, the quality of the arc also must be considered.

Modern machinery is expected to achieve satisfactory welding results even in the range of a few Amperes in connection with thin sheet metal. Ac welding machines are overwhelmingly used for welding of aluminum, the great disadvantage being that a highly temperature-resistant oxide layer forms on the surface of the metal. This oxide skin is destroyed by a commutation of the welding current as well as the use of a high-voltage ignition device which penetrates the oxide skin with its short, but energy-rich pulses. With low welding currents, the amount of energy supplied to the arc is comparatively low. Tests have shown that during welding with low currents, the selection of a high alternating frequency is advantageous. The more frequent polarization changes have a beneficial effect on the arc and on the cleaning of the aluminum surface. With high currents, there is so much energy contained in the arc that this aspect is of no importance.

The present state of the art provides a step switch or a potentiometer for the welding machine by which the operator can pre-select the alternating frequency.

However, this solution has some disadvantages. With each change of the pre-selected current, the operator is required to adjust the frequency at the same time. Often less qualified persons who do not know the fundamental operation may work with a disadvantageous setting for a long time. Furthermore, in a TIG-machine, the welding current is not a constant, but rather continuously changes during normal operation. Initially, there is an increasing ramp, that is, the current begins low, for example, with 20% of the end value, and increases during a pre-selected time to the end value. In the same way there is a decreasing ramp of, for example, four seconds at the end of welding. The machines also provide the possibility of pulsing. This means that, in selectable time intervals, the welding current is switched between the highest value and a selectable lower value, for example, 40% of the highest value. If the operator operates with a foot pedal, as is still mostly the case, he can regulate the current individually.

Accordingly, the fixed setting of the alternating frequency by means of a separate knob does not take into account in any way the continuously changing current value.

SUMMARY OF THE INVENTION

It is an object of this invention to automate the setting of the alternating frequency and to obtain the following advantages:

increased user friendliness, because the frequency is always optimally adjusted to the welding current, and minimized noise pollution due to a reduction of the frequency with high currents.

This object is attained in accordance with this invention in that the alternating frequency of the welding current is changed as a function of the amount of the actual welding current, so that a low alternating frequency is obtained with high currents and a high alternating frequency with low currents. This method has an unexpected useful side effect very much appreciated by the operators: because the frequency now has a direct relation to the current strength, the operator can determine the strength of the current from the frequency. This "acoustic Amperemeter" provides additional operational safety and facilitates pulsing or ramping, because it is easier to estimate how long the ramp times or pulse times will last. The features of this invention will be better understood from a description in conjunction with the drawings.

Figure 1:
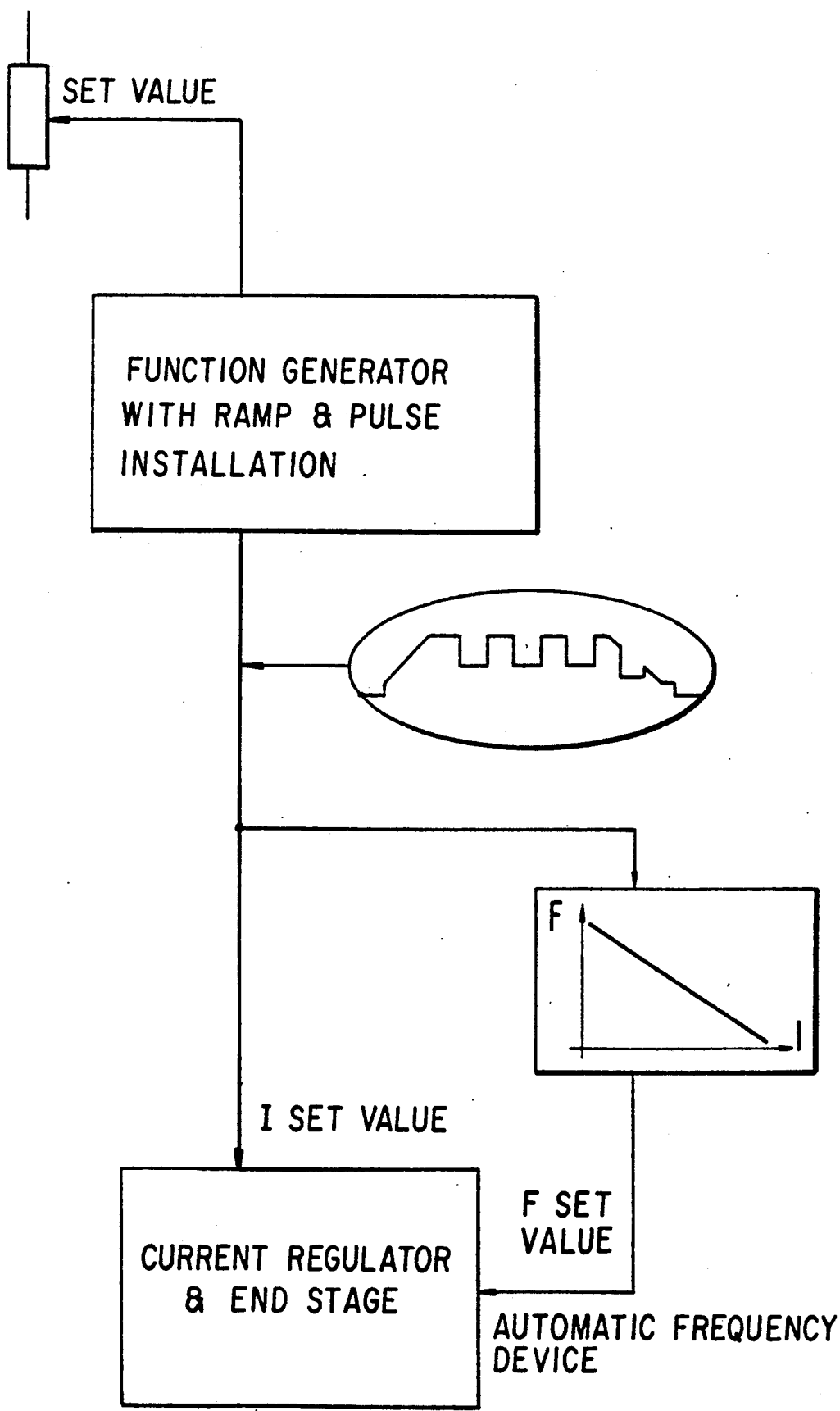
FIG. 1 shows one embodiment of the method in accordance with this invention.

The adjustable current set value, which is set, for example, with a potentiometer, flows through a function generator by which the typical curve shape of TIG welding is generated. The ramps at the beginning and end are inserted and the pulse functions are also realized. The oval portion shows this typical current flow over time. This is the set value for the current regulator which subsequently controls the power end stage. The end stage has a second input for the alternating frequency by means of which the welding current is commutated. Instead of connecting a potentiometer at the end stage, a voltage is generated by a circuit assembled with known means which is inverse to that of the set value, as shown by the F/I diagram of FIG. 1. In this manner, a function is provided where with high current the frequency is low and with low current the frequency is high, and which function corresponds to the actual welding current.

We claim:

1. A method for noise reduction and stabilization of the welding arc in TIG-ac-welding machines with self-commutated inverter current sources, comprising changing a frequency of a welding current having an alternating polarity as a function of an amount of an actual welding current the frequency of the welding current being controlled in an inverse relation to the amount of the actual welding current so that with a high said actual welding current, a low said frequency is generated and with a low said actual welding current, a high said frequency is generated.

* * * * *